United States Defensive Publication [19] (H) [11] T972,002

Flores et al. [43] Jul. 4, 1978

[54] HIGH TEMPERATURE THERMOPLASTIC ADHESIVE COMPOSITIONS COMPRISING A PROPYLENE POLYMER AND AN ETHYLENE/CARBOXYLIC ACID COPOLYMER

[76] Inventors: David Perez Flores, 317 Pine; Kenneth Earl Bow, 104 Lily, both of Lake Jackson, Tex. 77566

[21] Appl. No.: 850,172

[22] Filed: Nov. 10, 1977

[51] Int. Cl.[2] ..... C08L 23/12

[52] U.S. Cl. ..... 260/897 B; 428/461

[57] ABSTRACT

Thermoplastic adhesive composition comprising from about 95 to about 5 percent by weight of a propylene polymer having a melt flow index of from about 0.5 to about 500 and from about 5 to about 95 percent by weight of an ethylene/$\alpha,\beta$-ethylenically unsaturated carboxylic acid copolymer containing from about 1 to about 30 percent by weight of said acid copolymerized therein and having a melt index of from about 0.5 to about 500 can advantageously be used as thermoplastic adhesives for metals and polymeric substrates and are capable of retaining their adhesion to such substrates at elevated temperatures. Such compositions are particularly useful as adhesives in the manufacture of a retortable pouch for food which will withstand normal retort conditions.

9 Claims, No Sheets Drawing,

13 Pages Specification

The file of this unexamined application may be inspected and copies thereof may be purchased (849 O.G. 1221, Apr. 9, 1968).